United States Patent
Kang et al.

(10) Patent No.: US 7,817,286 B2
(45) Date of Patent: Oct. 19, 2010

(54) ITERATION METHOD TO IMPROVE THE FLY HEIGHT MEASUREMENT ACCURACY BY OPTICAL INTERFERENCE METHOD AND THEORETICAL PITCH AND ROLL EFFECT

(75) Inventors: Soo-Choon Kang, San Jose, CA (US); Remmelt Pit, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 373 days.

(21) Appl. No.: 11/644,695

(22) Filed: Dec. 22, 2006

(65) Prior Publication Data

US 2008/0151408 A1  Jun. 26, 2008

(51) Int. Cl.
   *G01G 11/02* (2006.01)
(52) U.S. Cl. .................................... 356/507
(58) Field of Classification Search ............... 356/501, 356/507; 73/682.624; 360/236.3
See application file for complete search history.

(56) References Cited

U.S. PATENT DOCUMENTS

| | | | |
|---|---|---|---|
| 4,630,926 A * | 12/1986 | Tanaka et al. ............... 356/507 |
| 5,502,565 A * | 3/1996 | Fukuzawa et al. ........... 356/507 |
| 5,673,110 A | 9/1997 | Erickson et al. |
| 5,680,213 A * | 10/1997 | Hunsaker et al. ............ 356/507 |
| 5,710,632 A * | 1/1998 | Li .............................. 356/507 |
| 5,767,964 A * | 6/1998 | Wahl et al. ................... 356/507 |
| 5,880,840 A | 3/1999 | Li |
| 5,953,125 A | 9/1999 | de Groot |
| 6,477,013 B1 | 11/2002 | Kang et al. |
| 6,590,667 B1 | 7/2003 | Lee et al. |
| 6,624,892 B1 | 9/2003 | Johnson |
| 6,688,743 B1 | 2/2004 | Durnin et al. |
| 6,710,881 B1 | 3/2004 | Ngoi et al. |
| 6,847,459 B2 * | 1/2005 | Zhu et al. .................... 356/507 |

OTHER PUBLICATIONS

Zhu et al., "Measurement of Head/Disk Spacing with a Laser Interferometer," Nov. 1988, IEEE Transactions on Magnetics, vol. 24, No. 6, pp. 2739-2741.*

* cited by examiner

*Primary Examiner*—Gregory J Toatley, Jr.
*Assistant Examiner*—Scott M Richey
(74) *Attorney, Agent, or Firm*—Maryam Imam; IPxLaw Group LLP

(57) ABSTRACT

In one embodiment and method of the present invention, an optical interference fly height (FH) test apparatus for measuring FH is disclosed, in accordance with an embodiment of the present invention, to include a slider, a transparent disk, means for directing a light beam directed between the slider and the disk, and means for iteratively measuring an estimated FH using at least two points of measurement on the slider when the slider is moved away from the disk at a pitch angle, wherein the estimated FH is computed as a function of the pitch angle and during each iteration, a previously-estimated FH is used to converge the estimated FH so that the estimated FH is within a predetermined range from the actual FH.

32 Claims, 8 Drawing Sheets

ABS

ITERATION METHOD TO IMPROVE THE FLY HEIGHT MEASUREMENT ACCURACY BY OPTICAL INTERFERENCE METHOD AND THEORETICAL PITCH AND ROLL EFFECT

BACKGROUND OF THE INVENTION

1. Field of the Invention

The present invention relates generally to a method and apparatus using optical interference, and more particularly to an improved method and apparatus using optical interference to measure fly height (FH).

2. Description of the Prior Art

"Fly height (FH)" is the vertical distance between a slider and a disk in a disk drive system or hard disk drive (HDD). FH is measured after calibration and an error is introduced during this process, which is clearly undesirably.

That is, in a HDD, a slider carries a read/write element that flies over a disk having magnetic layers with a given speed. Accurate measurement of the FH is important and need be controlled to know, for example, what signal is received at a given FH and for controlling the process by being able to measure FH repetitively. FH can be measured at different points of the slider so as to capture tilts associated with the slider. A mean plane is calculated by the average of different FH measurements of the slider. The read gap is the distance between the disk and the read element of the slider and the write gap is the distance between the write element of the slider and the disk. The air bearing surface (ABS) is the surface facing the disk. The slider flies at a certain pitch angle and to measure the latter, the FH is measured at one or more points on the ABS close to the leading edge of the slider (the edge upstream of the airflow) and another one or more points close to the trailing edge (the edge downstream of the airflow) and the difference between the two (or more) FH measurements divided by the planar distance between these points is the calculated pitch angle. Similarly, the slider flies at a certain roll angle which is calculated by measuring the FH at one or more points on each side of the ABS, but this time the points are in the radial direction relative to the disk.

When defining the magnetic spacing or the distance between the read and/or write element and the magnetic layers on the disk, it is necessary to know the precise FH. As the magnetic spacing is reduced to obtain higher density, the accuracy of the FH becomes more critical. Fly heights are measured during manufacturing and more specifically, during a calibration process. This is done to compensate for a pre-existing error. That is, the distance between the disk and the slider, i.e. FH, is presumed to be and remain parallel or even in terms of all of the points of the slider are at the same distance away from like points of the disk. However, this presumption is flawed because the slider is actually tilted relative to the disk. Measurements of the FH are performed, during calibration, assuming a parallel position of the slider relative to the disk and the result of the calibration is then used to measure the tilt and fed back into the measurement.

During calibration, the intensity of reflected light is measured and the calibration result is in turn used to measure the FH at normal disk velocity and slider skew angles.

One prior art method of measuring FH uses optical interference where an optical FH tester is used to measure FH during calibration. The slider is flown over a transparent surface. Then light of a given wavelength is directed to interfere at the slider-disk interface and the reflected intensity is then a direct function of the air gap thickness, which is the FH.

The principle of operation of an optical FH tester, for example the DFHT5 tester made by KLA-Tencor of San Jose, Calif., is used to measure a reflected intensity and to use a calibration curve to translate the intensity to a FH, i.e. air gap thickness. The calibration curve is typically obtained by retracting the slider from the disk and measuring the maximum of intensity when the light interferes constructively (at ¼ wavelength) and the minimum of intensity when the light interferes destructively (at ½ wavelength). These two data points are then used to scale the intensity axis of the theoretical Int=f(FH) curve, wherein Int is the intensity and f(FH) is a function of the FH. The theoretical curve is computed using the optical indices of the slider and disk (n,k).

During calibration, the maximum and minimum intensity in the Red, Green and Blue are typically as follows:

|  | Blue | Green | Red |
| --- | --- | --- | --- |
| First maximum points: | 105 nanometer (nm) | 130 nm | 155 nm |
| First minimum points: | 220 nm | 270 nm | 315 nm |
| Second maximum points: | 330 nm | 410 nm | 480 nm |

FIG. 1 shows a graph of a typical Int=f(FH) curve for two different slider pitch values. The x-axis represents the FH (in nm) and the y-axis is the normalized Int (in percentage). The spot size of the light source is typically 25 micrometers (um) in diameter. Thus, the reflected intensity is the average over the spot size. When the slider is retracted from the disk, the air bearing breaks and typically, the maximum-respectively minimum of intensity is found when the FH is around 100 nm for blue light, respectively 220 nm. At those FH, the pitch of the slider can be as high as 3000 micro radians (urad). It is typically expected to be 500-1000 urad. The precise value can be vary with the air bearing surface (ABS) design, each slider sample, and the retraction conditions (pull off velocity and disk speed (in revolutions per minute (rpm)).

The problem with the foregoing measurement of FH is that with a pitch angle (of the slider) of a given value, such as 1000 micro rads, the FH at one end of the spot size is 25 nanometers higher than the other side, i.e. 1000 urad×25 micrometers=25 nanometers. Therefore, the maximum intensity measured during calibration is smaller than if the pitch were exactly zero. For the same reason, the minimum intensity is higher than if the pitch were zero. One consequence of the foregoing is that the instrument can easily report a "negative FH", which is clearly unacceptable. The measured intensity changes and an undesirable error is included in FH. At lower FH and/or higher pitch differences between measurement and calibration, the error becomes larger. The problem of roll is the same problem as with pitch. The pitch angle results from the movement of the slider from the trailing edge to the leading edge and the roll angle results from movement of the slider from one side to another side.

Thus, when using white light as an illumination source, temporal coherence is lost for successively longer wavelengths until interference effects are no longer observed as the separation increases. This limits the largest spacing that can be measured using the interference of light method to measure FH. Typically, films that are thicker than about 1,250 nm cannot be measured. Accordingly, the maximum pitch and roll angles that can be measured are also limited.

Thus, there is a need for a method and apparatus to improve the accuracy of FH measurement by removing an error introduced during calibration into the FH measurement.

SUMMARY OF THE INVENTION

To overcome the limitations in the prior art described above, and to overcome other limitations that will become apparent upon reading and understanding the present specification, the present invention discloses a method and a corresponding structure for improving the accuracy of measuring the fly height (FH) of an ABS for a disk drive unit, by improving the calibration method, which is done by iteratively measuring the FH during calibration and computing the pitch angle, the roll angle or both.

Briefly, a optical interference FH test apparatus for measuring FH is disclosed, in accordance with an embodiment of the present invention to include a slider, a transparent disk, means for directing a light beam directed between the slider and the disk, and means for iteratively measuring an estimated FH using at least two points of measurement on the slider when the slider is moved away from the disk at a pitch angle, wherein the estimated FH is computed as a function of the pitch angle and during each iteration, a previously-estimated FH is used to converge the estimated FH so that the estimated FH is within a predetermined range from the actual FH.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

BRIEF DESCRIPTION OF THE DRAWINGS

Referring now to the drawings in which like reference numbers represent corresponding parts throughout.

DETAILED DESCRIPTION OF THE EMBODIMENTS OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

In the present invention, an iterative process is used to improve measuring of FH during calibration. The iterative process is based on using the pitch angle to estimate FH at each iteration so that each subsequent iteration results in an FH measurement/computation that is closer to the true or actual FH until the measured or approximated FH is within a predetermined range of the actual FH. The principle behind such a process is that light interferes in multi-dielectric structure, such as a transparent disk and the reflected intensity of the light is a function of air gap thickness. Calibration is performed by unloading to define the maximum and minimum of a wave, such as a sine wave, associated therewith and the measured values are used to calculate the pitch angle using optics theory. Measurements are of the intensity of the light because such intensity is related to FH. FH is computed using intensity and the calculated pitch angle.

In one method of the present invention, the slider is pulled away from the disk and the intensity is measured as it is retracted and the FH increases causing traveling through maximum and minimum intensities and FH is measured accordingly during calibration.

Figure 1:
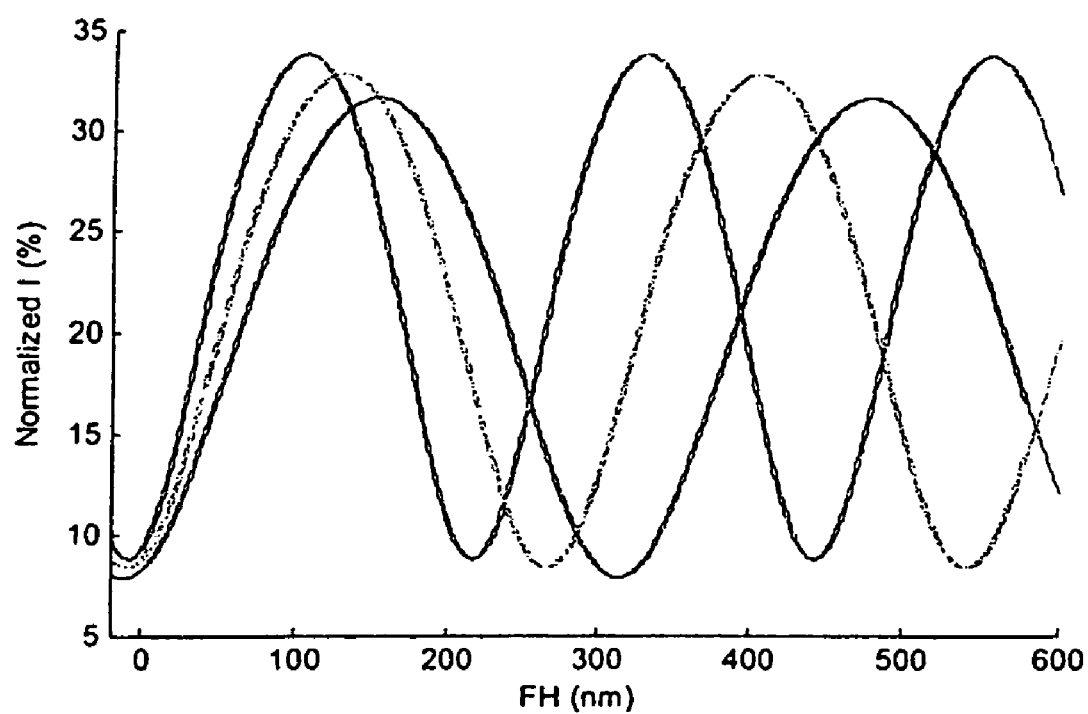
FIG. 1 shows a graph of a typical Int=f(FH) curve for two different slider pitch values.
Figure 2:
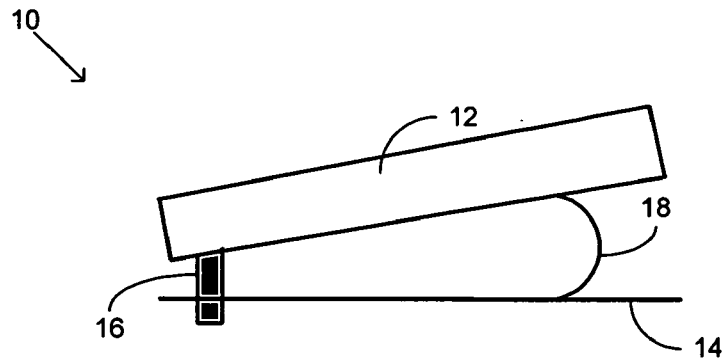
FIG. 2 shows an optical interference FH test apparatus 10, at a side view thereof, to include a slider 12, a transparent disk 12 and a light beam 16 directed from the slider onto the disk 14, in accordance with an embodiment of the present invention.

In FIG. 2, an optical interference FH test apparatus 10 is shown, at a side view thereof, to include a slider 12, a transparent disk 12 and a light beam 16 directed from the slider onto the disk 14, in accordance with an embodiment of the present invention. FH is measured at different points along the length of the slider 12 and is then averaged over the measured points (spot size). The averaging is done using an integral function. The slider 12 is shown tilted by virtue of having been pulled upwardly. The angle of the tilt 18 is the pitch angle, which is 1 to 2 degrees in the free state, defined as the pitch static attitude (PSA) and 50 to 400 micro radians when the slider 12 is loaded onto the disk. The slider's natural tendency is to move toward the disk 12.

Figure 3:
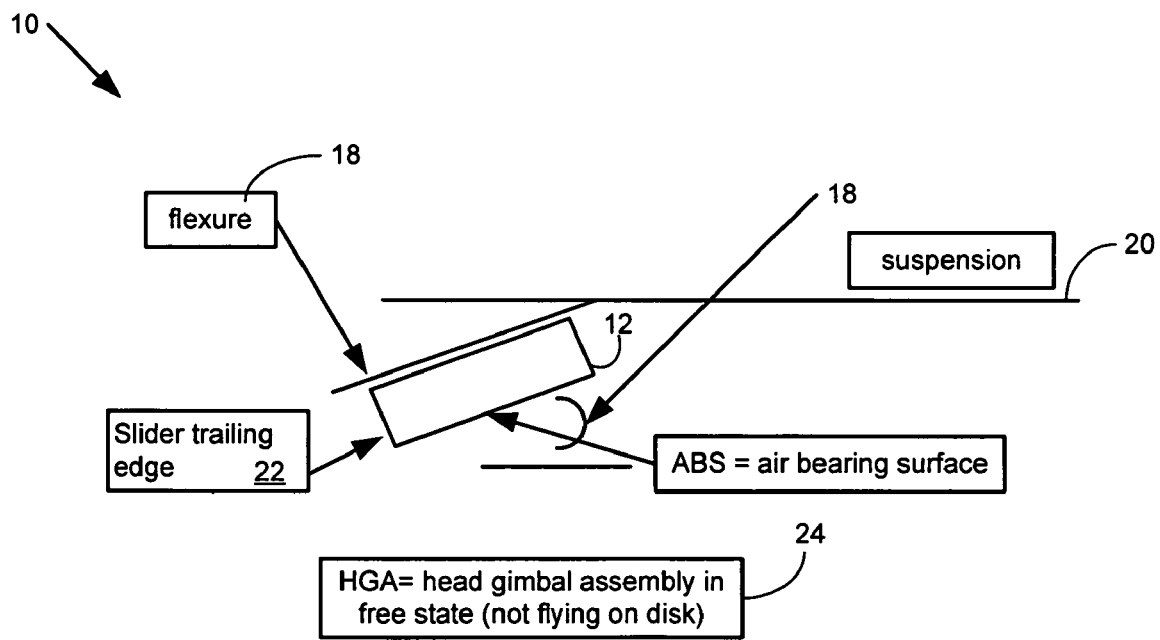
FIG. 3 shows further details of the apparatus 10.

As the slider 12 is pulled upwardly, the slider 12 starts to pitch. FIG. 3 shows further details of the apparatus 10 with a flexure 18 shown glued onto the slider 12 and a suspension 20 shown positioned on top of the flexure 18 at a leading edge of the slider 12. A trailing edge 22 of the slider 22 is shown at an end of the slider that is opposite to the pitch angle. A head gimbal assembly (HGA) 24 is shown at a free state and not moving or flying on the disk.

Figure 4:
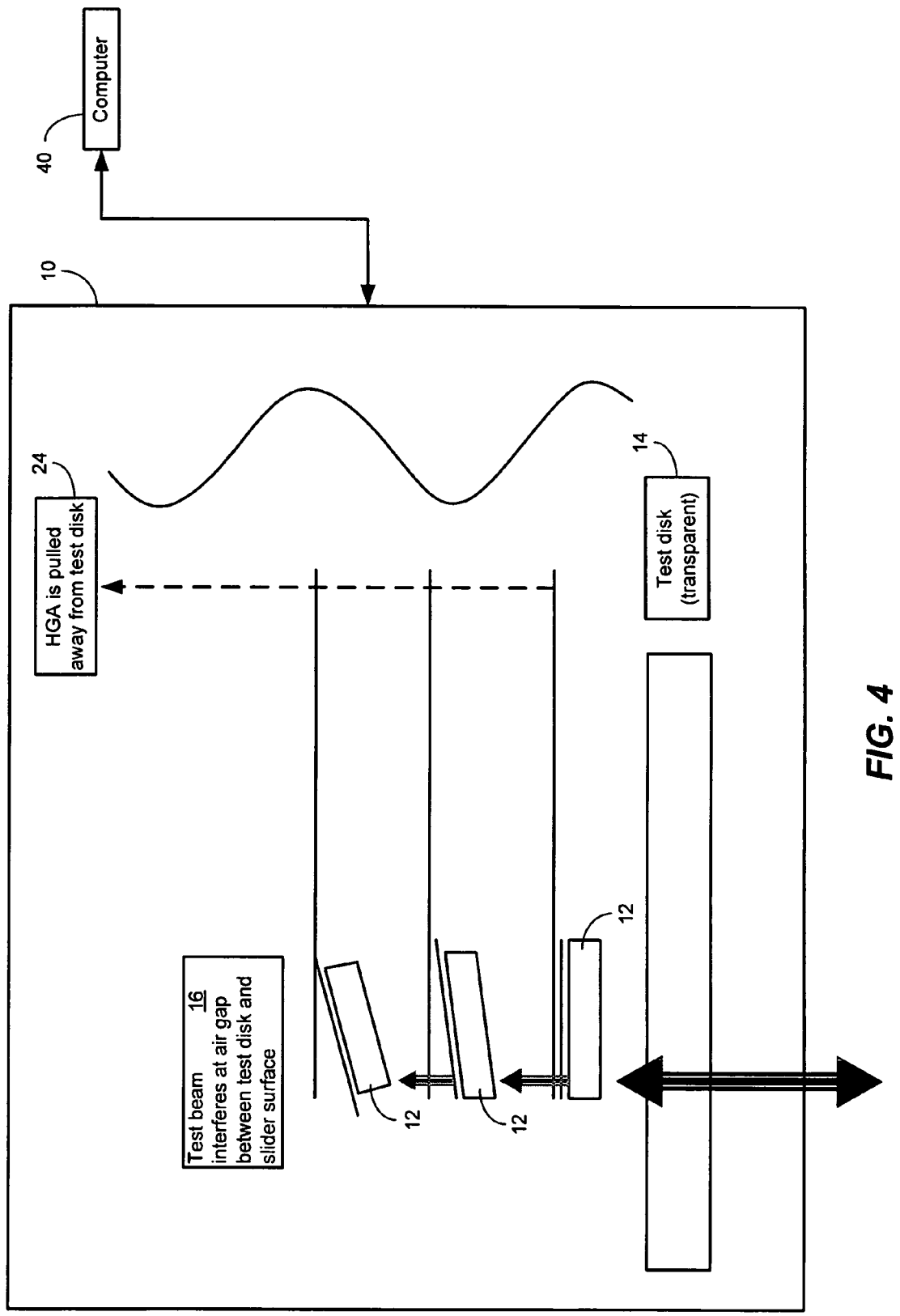
FIG. 4 shows the process of measuring FH using the apparatus 10, in accordance with a method of the present invention.

FIG. 4 shows the process of measuring FH, at a trailing edge of the slider 12 (of FIGS. 2 and 3), during calibration, using the apparatus 10 and the relative position of the slider 12 during the process, in accordance with a method of the present invention. First, the HGA 24 is pulled away (or retracted) from the disk 14 and as this is done, the test light beam 16 interferes at an air gap between the disk 14 (of FIGS. 2 and 3) and the slider's surface. As the slider is pulled away from the disk, the light that is reflected has the characteristic of a sine wave and thus goes through minimums and maximums. These minimums and maximums are measured. That is, light is reflected back having an intensity depending on the air gap thickness that is constructive and destructive interference. As the HGA 24 is retracted, the slider pitches. In FIG. 4, the apparatus 10 is shown to operate under the direction of a computer 40, which is utilized for other functions, such as storing tables.

Figure 5:
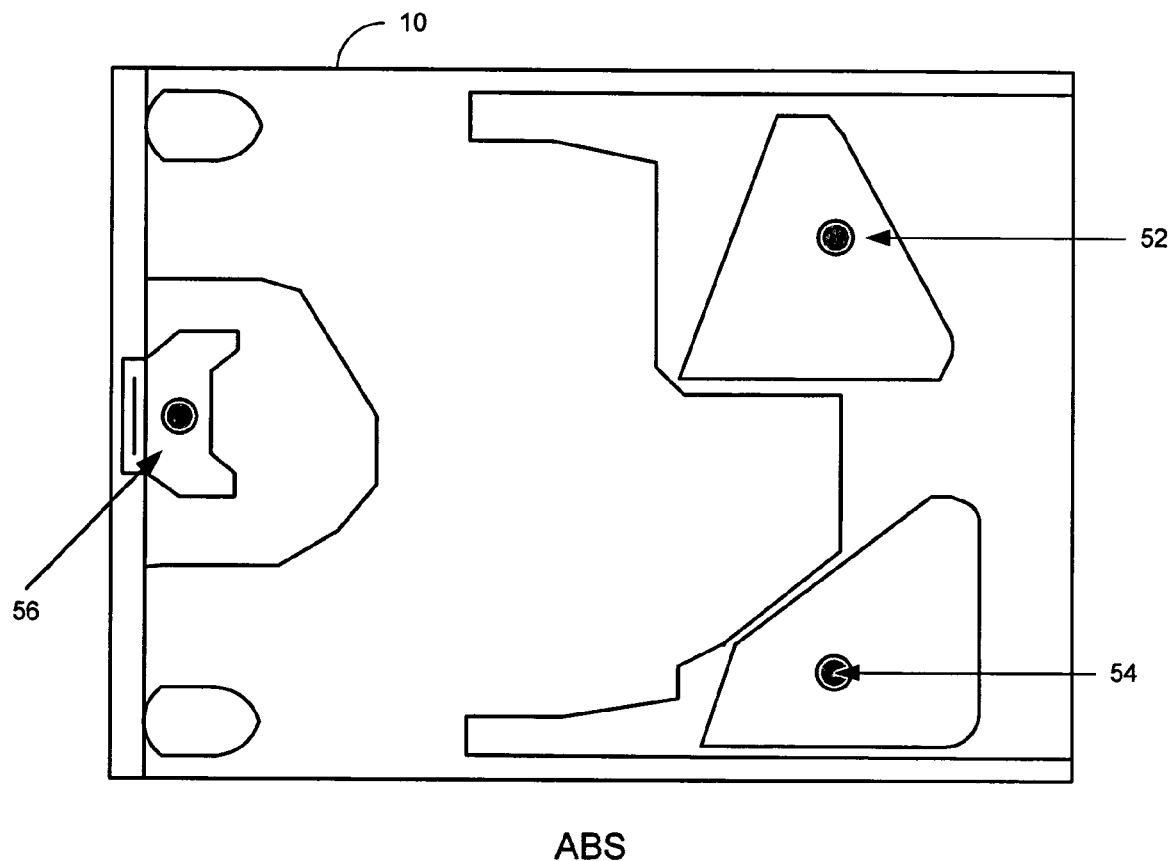
FIG. 5 shows measurement taken, at an ABS view of the apparatus 10 for measuring FH at three points of the slider 12.

FIG. 5 shows measurement taken, at an ABS view of the apparatus 10 for measuring FH at three points of the slider 12. The three points of measurement being located at a trailing edge (TE) ABS point 56, at a leading edge (LE) ABS point 152 and at a leading edge ABS point 254. Optionally, only measurements are taken at only two points, a trailing edge and one leading edge. Due to measuring over a fairly large area when taking the measurement points for the FH coupled with a large spot size, which is the width of the light 16, uncertainty in the FH measurement is introduced. However, the minimums and maximums of the different FH measurements happen at different times. So, if one of the measurements is FH1 and another is FH2, when FH1 goes through a minimum, FH2 is not doing so and vice versa. Thus, the reflective light is not a cumulating and total intensity is not observed.

Figure 6:
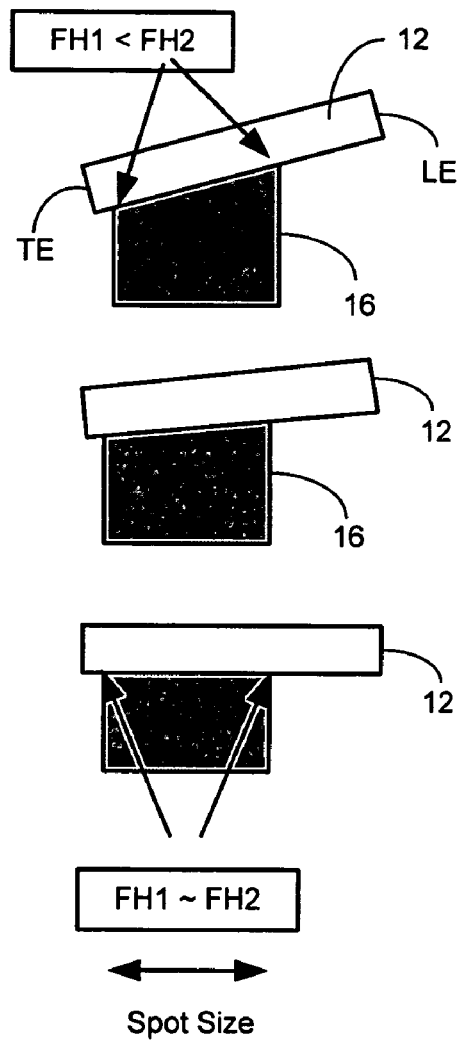
FIG. 6 shows a side view of the slider 12 at three different positions with the light beam 16 directed therefrom.

FIG. 6 shows a side view of the slider 12 at three different positions with the light beam 16 directed therefrom and when FH measurements are taken as the slider 12 is unloaded or moved upwardly and away from the disk. The bottom-most part of the figure shows the slider 12 at a substantially parallel position relative to the disk when an FH measurement at a TE or FH1 is substantially equal to an FH measurement at the LE or FH2. As the slider 12 moves upwardly, the FH1 becomes smaller than the FH2.

Figure 7:
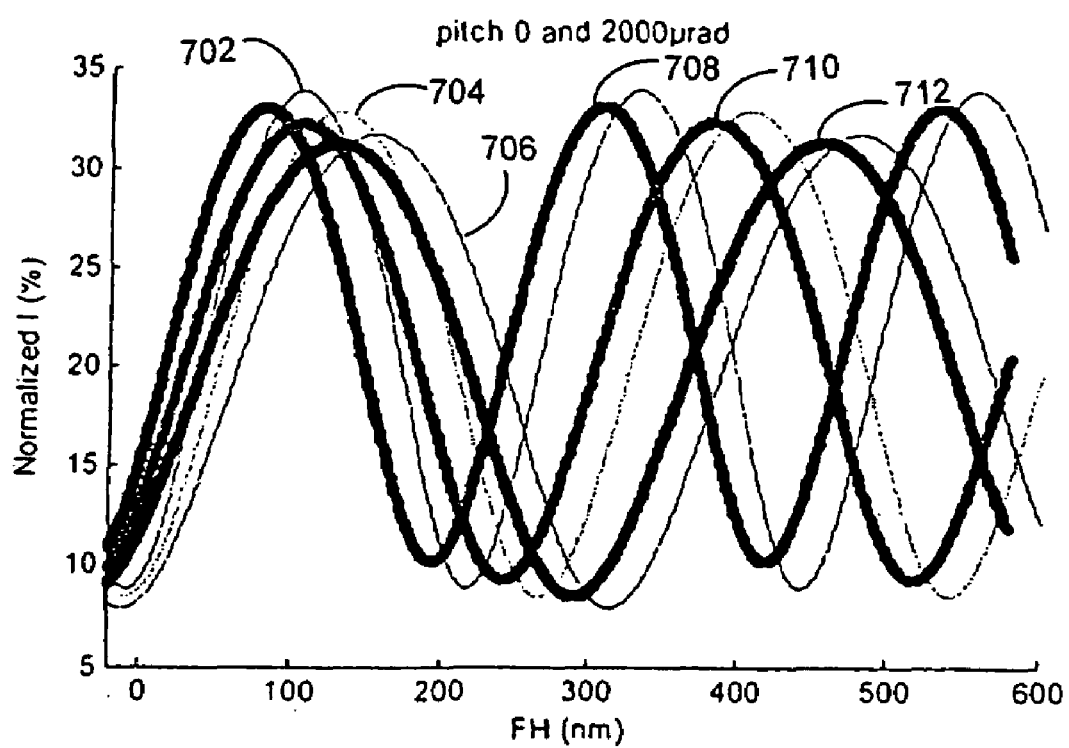
FIG. 7 shows plots of FH vs. Int (Intensity, normalized) when light (blue, green and red) is reflected back from the disk.

The graph in FIG. 7 shows plots of FH vs. Int (normalized) when light (blue, green and red) is reflected back from the disk. The lines 702-706 show the ideal situation where pitch is zero and thus, the minimums and maximums of these lines is what ideally would be measured, whereas, the lines 708, 710 and 712 show graphs of the FH where the pitch is 2000 urad. Thus, the lines 702-706 reflect actual or true FH whereas the lines 708-712 reflect the measured FH. For each type of wavelength of the light, the actual FH trails or is less than that of the ideal (at pitch 0). The FH at pitch 0 is desirable to be achieved. The pitch angle is measured by making at least two measurements of the FH, one at the trailing edge, i.e. 56 in FIG. 5 and one at the leading edge, i.e. 52 or 54 in FIG. 5, of the slider. Knowing the distance between these two points, the difference in the FH is divided by the distance to obtain the pitch angle (difference in FH/distance=pitch angle).

Referring back to FIG. 4, the FH is measured as the pitch angle is changing or increasing knowing that there are errors in the FH, as shown relative to the graph of FIG. 7 and a graph of the pitch angle as a function of time is realized (by calculating the pitch angle using the difference in FH divided by the distance). Once the pitch angle over time is realized, the true or accurate FH can be realized by determining what the FH would have been if the pitch angle were zero by using the graph of the pitch angle as a function of time. If you have a pitch angle, you know what the reflected intensity would be between FH1 and FH2. Then, the pitch angle as a function of FH is estimated and the estimated pitch angle values are used to correct the minimum and maximum intensity of reflected light, using optics theory, taking into account the spot size. For each pitch angle, a correction to the FH can be calculated in terms of what the reflected intensity of light be if the pitch angle were zero compared to having a fixed pitch angle. However, the pitch angles are estimated by using a FH measurement which has an inherent error. Therefore the pitch angles inherently have an error and it is necessary to go through an iteration process to reduce the error further. Essentially, the difference between two FHs of subsequent functions is the error. The FH of an n function is FH(n) and a FH of an n−1 function is FH(n−1). This process is performed repetitively, with the FH derived from the estimated pitch angle, until the difference between the FH1 and FH2 are close. This process takes into account the pitch angle and is therefore more accurate. This process is illustrated in flow chart form in FIG. 8.

Figure 8:
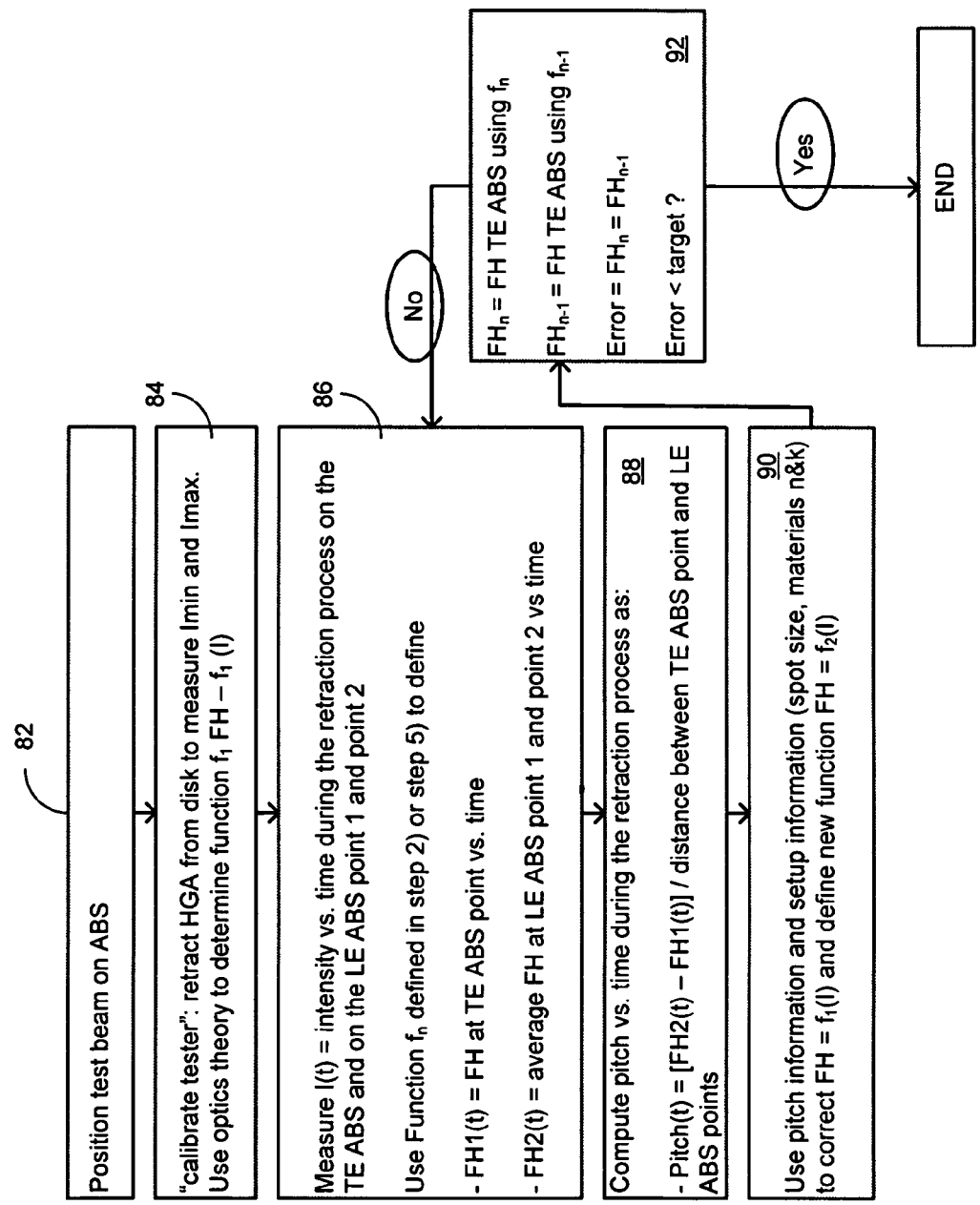
FIG. 8 shows a process of measuring FH in accordance with a method of the present invention.

In FIG. 8, at step 82, the light 16 or light beam is positioned on the ABS. Next, at step 84, the apparatus 10 is calibrated by retracting the HGA 24 from the disk 14 to measure Imin and Imax, minimum and maximum reflected intensities of light, respectively. Optics theory is used to determine a first function, f1, of FH or FH=$f_1$(b). Next, at step 86, the intensity of light is measured as a function of time during the retraction process at the trailing edge ABS such as at 56 in FIG. 5 and on the leading edge ABS at points 1 and 2, such as the at 52 and 54 in FIG. 5. The function f1 from the step 84 is then used to define FH1 as a function of time or FH1(t)=FH at TE ABS point vs. time and an integral or average of FH is determined by FH2(t)=average FH at LE ABS point 1 and point 2 vs. time. Next, at step 88, pitch angle is computed vs. time during the retraction process as:

$$\text{Pitch angle }(t)=[FH2(t)-FH1(t)]/\text{distance between }TE \text{ ABS point and }LE\text{ ABS points} \quad \text{Eq. (1)}$$

I think the discussion may gain in clarity if we redefine the different FH points as follows: FH56=measured FH at point 56 (FIG. 5), which is the average of all FHs over the size of the light beam. FH56te=real FH at TE of the spot at point 56 (shown as "FH1" in FIG. 5), FH56le=real FH at LE of the spot at point 56 (shown as "FH2" in FIG. 5). In the example of FIG. 5., the pitch angle is then calculated as Let FH53= (FH52+FH54)/2=the average FH at the LE estimated using 2 points. Pitch=(FH53−FH56)/distance in the length direction between points 53 and point 56. This notation distinguishes more clearly the measure FH (integral over spot size) from the actual FH at a given point of the spot size.

Next, at step 90, the pitch angle information and setup information, such as spot size, materials n&k are used to correct FH so that FH=f1(I) and to define a new function FH=f2(I). Next, at 92, FHn is set equal to the FH TE ABS using fn and FHn−1 is set equal to FH TE ABS using fn−1 and the error is calculated by subtracting FHn−1 from FHn and if the error is determined to be less than a target or predetermined error value (in one embodiment, this may be within 10%), the process ends, otherwise, the process continues back to the step 86 where this time, the fn at step 90 is used, in place of the f1 of step 84, to define the FH53(t) and the FH54(t) and because the new fn is based on pitch angle, it is more accurate than the previous fn−1. The process continues to loop through the steps 86 and 92 until the error at step 92 is detected to be less than a predetermined error.

Optionally, at step 86, the two or more points being measured may be measured sequentially with the test beam fixed on a single point during the whole time of the retraction process. That is the slider can be placed back to take the second point measurement. This would result in the points being measured one after another. Yet optionally, the two points may be measured pseudo-simultaneously with the test beam moving between each point during the retraction, at a rate faster than the retraction process. Yet alternatively, a beam deflector coupled with an oscillator may be used to move the test beam between the test points, which is further described relative to FIG. 9.

At step 88, optionally, the roll angle vs. time may be computed using two points at each side of the slider in the width direction thereof and the process done in the manner described relative to FIG. 8.

During step 86, intensity at minimums and maximums is measured and computed and as the process goes through various iterations, each time, the Imax and Imin are adjusted based on a correction factor, for each intensity, retrieved from a table stored in the computer 40 of FIG. 4 shown coupled to the apparatus 10. For example, representing the correction factor for an Imax as cmax and for Imin as cmin, the following equations are used to compute the new Imax and Imin represented by Imax* and Imin*, respectively, as follows:

$$Imax^* = Imax - cmax(400 \text{ urad}) \times (Imax - Imin) \quad \text{Eq. (2)}$$

$$Imin^* = Imin - cmin(1000 \text{ urad}) \times (Imax - Imin) \quad \text{Eq. (3)}$$

Wherein the measured or estimated pitch angle is used to measure the Imax and Imin and finds that the pitch is 400 urad when going through the first maximum and 1000 urad when going through the first minimum. Then, the new Imax* and Imin* are used as the new values in determining the intensity vs. FH graph.

The steps of FIG. 8 are performed by the computer 40.

Figure 9:
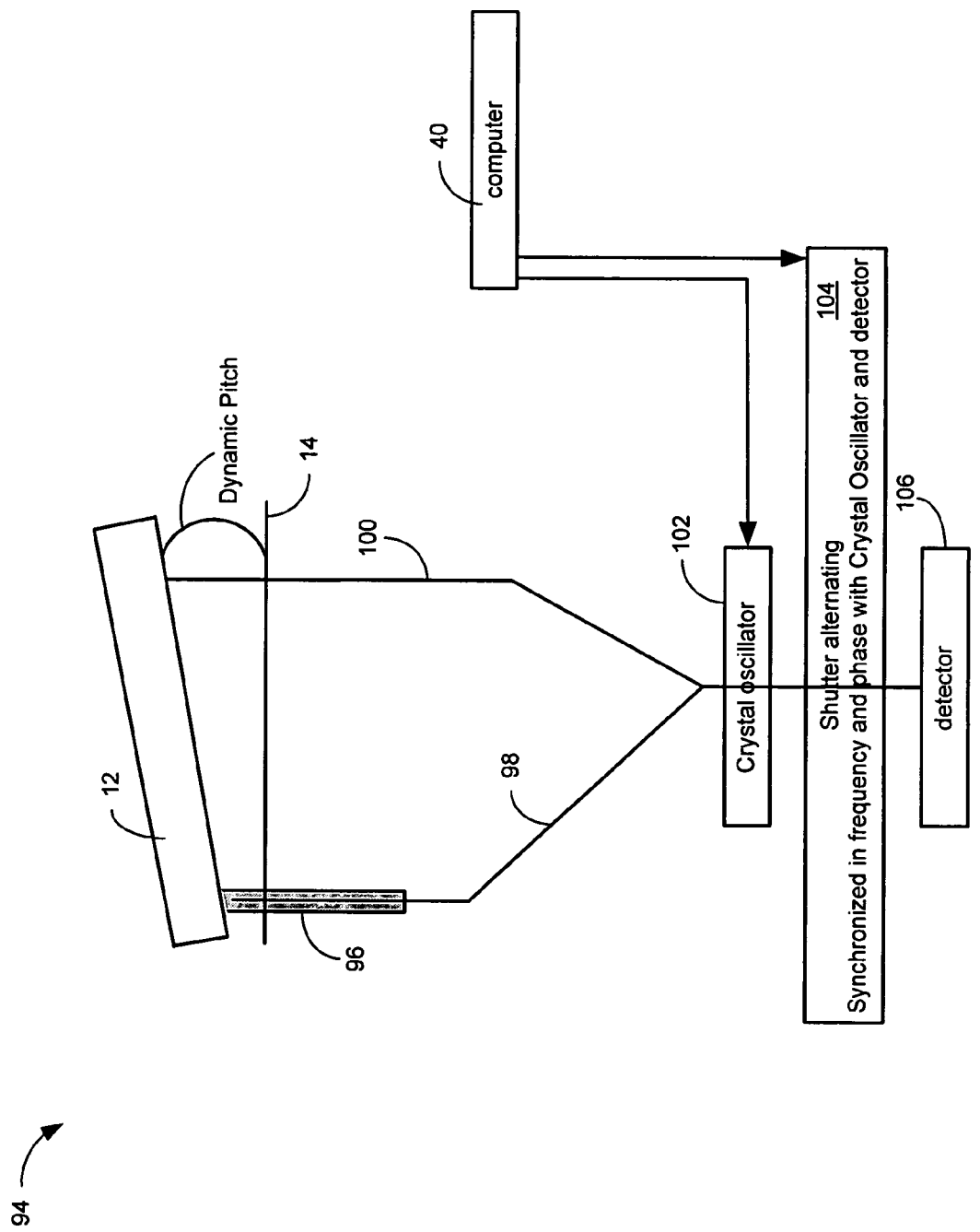
FIG. 9 shows an alternative optical interference FH test apparatus 94.

FIG. 9 shows an alternative optical interference FH test apparatus 94, in accordance with an alternative embodiment of the present invention, to include the slider 12 and the disk 14 with a light beam 96 directed thereto. The light beam 96 can be deflected, at 98, from it's original path by any known method (for example, a mirror or a prism). An oscillator 102 can be combined with the aforementioned deflector to direct the light beam 96 alternatively to a point at the TE of the ABS (e.g. at 56 in FIG. 5) and at a point on the LE of the ABS (e.g. at 52 or 54 in FIG. 5). To this end, the light beam 96 may be rapidly moved from the TE to the LE of the slider 12, at 100, to measure two points substantially simultaneously. The shutter 104 is shown to operate with the oscillator 102, in FIG. 9. For example, in operation, once the oscillator 102 has been positioned to have the beam on the TE, the shutter 104 then closes and the oscillator 102 deflects the light beam to point to the LE and the shutter opens once again for the FH measurement to be taken, as previously described. In this manner, the FH measurements at the TE and LE of the slider 12 are taken substantially simultaneously.

The shutter 104 is preferably synchronized to the oscillator 102. The oscillator 102 and the shutter 104 are under the control of the computer 40. The computer 40 ensures that the light beam is directed to the edge of interest, i.e. TE or LE. When the intensity of the deflected beam is measured, a determination is made as to whether the measurement is being taken at the TE or LE by a detector 106. The intensity of the light beam is measured vs. spacing for each of the TE and LE measurements and used to calculate the pitch angle in one calibration measurement. That is, the oscillator 102 allows for only one calibration measurement to be taken because the TE and LE measurements are taken substantially simultaneously. The embodiment of FIG. 9 advantageously avoids the problem associated with the trajectory of the pitch angle changing as the slider moves away from the slider from one calibration retraction measurement to the next one. More specifically, measuring two points, one at the LE and one at the TE in two separate retractions does not yield an accurate FH estimation if the pitch angle changed at a different rate during one of the two measurements. However, if the two points are measured substantially simultaneously, as by the apparatus 94, the change in the pitch angle's trajectory does not affect the estimation. This reduces the risk of erroneous measurement of FH and improves the accuracy thereof.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An optical interference fly height (FH) test apparatus for measuring FH comprising:
   a slider;
   a transparent disk;
   means for directing a light beam, with an intensity associated therewith, between the slider and the disk;
   computer-controlled means for iteratively measuring an estimated FH, during calibration, and averaging the estimated FH, the computer-controlled means further for iteratively measuring the FH by using at least two points of measurement on the slider when the slider is moved away from the disk at a pitch angle, the intensity of the light beam being measured as the slider is retracted relative to the disk thereby causing FH to increase and to travel through maximum and minimum light beam intensities,
   wherein the estimated FH is computed as a function of the pitch angle, during calibration, and during each iteration of estimating FH, a previously-estimated FH is used to converge the estimated FH so that the estimated FH is within a predetermined range from the actual FH.

2. An optical interference fly height (FH) test apparatus, as recited in claim 1, wherein the at least two points of measurement are at a trailing edge and at a leading edge of the slider.

3. An optical interference fly height (FH) test apparatus, as recited in claim 2, further including means for measuring the intensity of the light beam as a function of time.

4. An optical interference fly height (FH) test apparatus, as recited in claim 2, wherein the computer-controlled oscillator means for directing the light beam to a point at the trailing edge and at a point at the leading edge, wherein the light beam is rapidly moved from the trailing edge to the leading edge of the slider to measure two points substantially simultaneously so that the movement of the light beam from the trailing edge to the leading edge is at a rate faster than the retraction of the slider.

5. An optical interference fly height (FH) test apparatus, as recited in claim 4, further including a computer-controlled shutter synchronized to operate with the computer-controlled oscillator means in causing the oscillator means to turn the light on and off rapidly to point to the at least two points of measurement.

6. A method of measuring the fly height (FH) using optical interference comprising:
   directing a test beam, having associated therewith an intensity, between a slider and a transparent disk using a computer;
   measuring the minimum and maximums of a wavelength of the intensity of the test beam, during calibration;
   determining a function of the FH;
   measuring the intensity of light as a function of time for at least two points on the slider as the slider is moved away from the transparent disk at a pitch angle, the intensity of the test beam being measured as the slider is retracted relative to the transparent disk thereby causing FH to increase and to travel through maximum and minimum test beam intensities;

estimating the FH at the at least two points using the function of the FH;

computing the pitch angle using the estimated FHs at the at least two points;

using the pitch angle to adjust the estimated FHs to be closer to the actual FHs;

determining an intolerable error associated with the FHs; and repeating the measuring steps through the determining steps until the error associated with the FHs is tolerable.

7. A method of measuring the fly height (FH), as recited in claim 6, further including computing the roll angle.

8. A method of measuring the fly height (FH), as recited in claim 6, wherein the measuring of the intensity step is performed sequentially.

9. A method of measuring the fly height (FH), as recited in claim 6, wherein the measuring of the intensity step is performed substantially in parallel.

10. An optical interference fly height (FH) test apparatus for measuring FH comprising:
    a slider;
    a transparent disk;
    means for directing a light beam, having an intensity associated therewith, between the slider and the disk;
    means for iteratively measuring an estimated FH, during calibration, using at least two points of measurement on the slider when the slider is moved away from the disk at a roll angle, as the slider is moved away from the transparent disk at a pitch angle, the intensity of the light beam being measured as the slider is retracted relative to the transparent disk thereby causing FH to increase and to travel through maximum and minimum light beam intensities,
    wherein the estimated FH is computed as a function of the roll angle and during each iteration, a previously-estimated FH is used to converge the estimated FH so that the estimated FH is within a predetermined range from the actual FH.

11. An optical interference fly height (FH) test apparatus, as recited in claim 10, further including means for measuring the intensity of the light beam as a function of time.

12. An optical interference fly height (FH) test apparatus, as recited in claim 10, wherein the measurements of the at least two points is performed sequentially.

13. An optical interference fly height (FH) test apparatus, as recited in claim 10, wherein the at least two points of measurement are at a trailing edge and a leading edge of the slider and further wherein the measurements of the at least two points is performed substantially simultaneously so that the movement of the light beam from the trailing edge to the leading edge is at a rate faster than the retraction of the slider.

14. An optical interference fly height (FH) test apparatus, as recited in claim 10, further including a computer for controlling the apparatus.

15. An optical interference fly height (FH) test apparatus, as recited in claim 10, the means for iteratively measuring further for directing the light beam to a first point of the at least two points and at a second point of the at least two points, wherein the light beam is rapidly moved from the first point to the second point of the slider to measure two points substantially simultaneously so as the movement from the trailing edge to the leading edge being at a rate faster than the retraction of the slider.

16. An optical interference fly height (FH) test apparatus, as recited in claim 15, further including a computer-controlled shutter synchronized to operate with the computer-controlled oscillator means in causing the oscillator means to turn the light on and off rapidly to point to the at least two points of measurement.

17. A method of measuring the fly height (FH) using optical interference comprising:
    directing a test beam, having associated therewith an intensity, between a slider and a transparent disk;
    measuring the minimum and maximums of a wavelength of the intensity of the test beam, during calibration;
    determining a function of the FH, during calibration;
    measuring the intensity of light as a function of time for at least two points on the slider, during calibration;
    estimating the FH at the at least two points using the function of the FH;
    computing the roll angle using the estimated FHs at the at least two points;
    using the roll angle information to adjust the estimated FHs to be closer to the actual FHs;
    determining an intolerable error associated with the FHs; and
    repeating the measuring steps through the determining steps until the error associated with the FHs is tolerable.

18. A method of measuring the fly height (FH), as recited in claim 17, further including computing the pitch angle.

19. A method of measuring the fly height (FH), as recited in claim 17, wherein the measuring of the intensity step is performed sequentially.

20. A method of measuring the fly height (FH), as recited in claim 17, wherein the measuring of the intensity step is performed substantially in parallel.

21. An optical interference fly height (FH) test apparatus, as recited in claim 1, wherein the computer-controlled means for measuring a third point at air bearing surface (ABS) when the slider is being retracted from the disk.

22. An optical interference fly height (FH) test apparatus for measuring FH comprising:
    a slider;
    a transparent disk;
    means for directing a light beam, with an intensity associated therewith, between the slider and the disk;
    computer-controlled means for iteratively measuring an estimated FH, during calibration, and averaging the estimated FH, the computer-controlled means further for iteratively measuring the FH by using at least two points of measurement on the slider when the slider is moved away from the disk at a pitch angle, the intensity of the light beam being measured as the slider is retracted relative to the disk thereby causing FH to increase and to travel through maximum and minimum light beam intensities, the computer-controlled means for computing the estimated FH as a function of the angle between the slider and the disk, during calibration, and during each iteration of estimating FH, a previously-estimated FH is used to converge the estimated FH so that the estimated FH is within a predetermined range from the actual FH.

23. An optical interference fly height (FH) test apparatus, as recited in claim 22, wherein the at least two points of measurement are at a trailing edge and at a leading edge of the slider.

24. An optical interference fly height (FH) test apparatus, as recited in claim 23, further including means for measuring the intensity of the light beam as a function of time.

25. An optical interference fly height (FH) test apparatus, as recited in claim 22, wherein the angle that is used for computing the estimated FH is the pitch angle.

26. An optical interference fly height (FH) test apparatus, as recited in claim 22, wherein the angle that is used for computing the estimated FH is the roll angle.

27. An optical interference fly height (FH) test apparatus, as recited in claim 22, wherein the computer-controlled oscillator means for directing the light beam to a point at the trailing edge and at a point at the leading edge, wherein the light beam is rapidly moved from the trailing edge to the leading edge of the slider to measure two points substantially simultaneously so that the movement of the light beam from the trailing edge to the leading edge is at a rate faster than the retraction of the slider.

28. An optical interference fly height (FH) test apparatus, as recited in claim 22, further including a computer-controlled shutter synchronized to operate with the computer-controlled oscillator means in causing the oscillator means to turn the light on and off rapidly to point to the at least two points of measurement.

29. A method of measuring the fly height (FH) using optical interference comprising:
    directing a test beam, having associated therewith an intensity, between a slider and a transparent disk using a computer;
    measuring the minimum and maximums of a wavelength of the intensity of the test beam, during calibration;
    determining a function of the FH;
    measuring the intensity of light as a function of time for at least two points on the slider as the slider is moved away from the transparent disk at a pitch angle, the intensity of the test beam being measured as the slider is retracted relative to the transparent disk thereby causing FH to increase and to travel through maximum and minimum test beam intensities;
    estimating the FH at the at least two points using the function of the FH;
    computing the angle between the slider and the disk using the estimated FHs at the at least two points;
    using the computed angle to adjust the estimated FHs to be closer to the actual FHs;
    determining an intolerable error associated with the FHs; and
    repeating the measuring steps through the determining steps until the error associated with the FHs is tolerable.

30. A method of measuring the fly height (FH), as recited in claim 29, further wherein the angle between the slider and the disk is the pitch angle.

31. A method of measuring the fly height (FH), as recited in claim 29, wherein the measuring of the intensity step is performed sequentially.

32. A method of measuring the fly height (FH), as recited in claim 29, wherein the measuring of the intensity step is performed substantially in parallel.

* * * * *